Patented Nov. 28, 1950

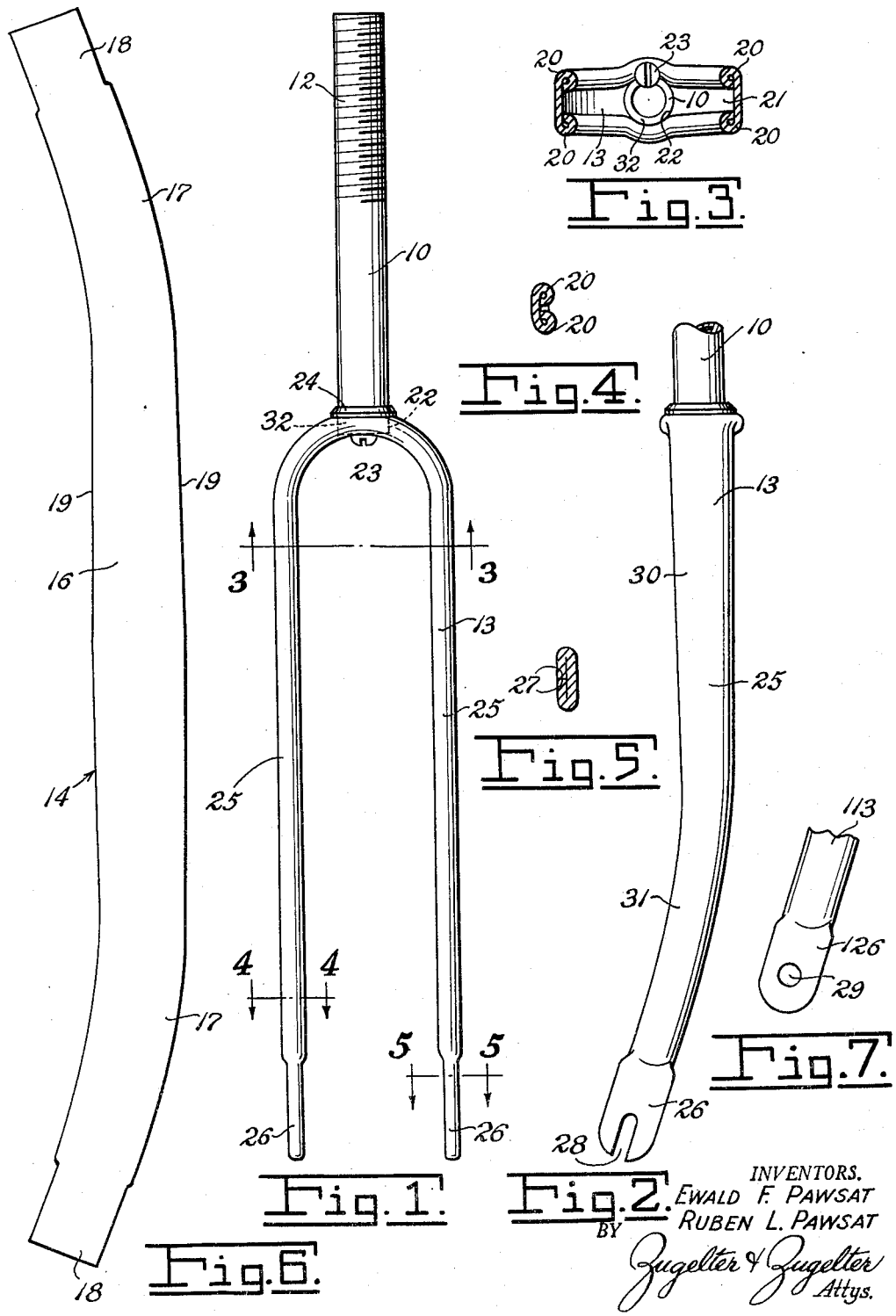

2,532,034

UNITED STATES PATENT OFFICE 2,532,034

STEERING FORK

Ewald F. Pawsat and Ruben L. Pawsat, Maysville, Ky.; said Ruben L. Pawsat assignor to said Ewald F. Pawsat Application August 6, 1948, Serial No. 42,764

2 Claims. (Cl. 280—279)

This invention relates to supporting structures for bicycles and the like and more particularly relates to a steering fork for a bicycle.

An object of this invention is to provide a reinforced steering fork structure.

A further object of this invention is to provide a steering fork which can be constructed of sheet material.

A further object of this invention is to provide a steering fork constructed of sheet material in which edges are hidden and do not protrude.

A further object of this invention is to provide a steering fork having reinforced edges.

A further object of this invention is to provide a reinforced steering fork which can be bent to shape without excessive deformation during bending.

The above and other objects may be attained by the means described herein and disclosed in the accompanying drawing in which:

Figure 1 is a front elevational view of a steering fork constructed in accordance with this invention.

Figure 2 is a side elevational view of the steering fork shown in Figure 1.

Figure 3 is a sectional view along the line 3—3 in Figure 1.

Figure 4 is a sectional view along the line 4—4 in Figure 1.

Figure 5 is a sectional view along the line 5—5 in Figure 1.

Figure 6 is a plan view, reduced in size, of a blank from which the steering fork may be formed.

Figure 7 is a fragmentary side elevational view showing an alternate construction for an end of the steering fork.

Briefly, this invention provides a steering fork or the like constructed from sheet metal stock. The fork may be made from a flat blank, and opposite lengthwise edges of the blank are rolled to form beads along the lengthwise edges. The fork is bent to form a U-shape, and a stem is attached to the fork centrally thereof. The ends may be swaged flat and bored or slotted for receiving an axle. The bead along the lengthwise edges gives strength to the fork while permitting it readily to be formed to a U-shape. Further, the bead conceals the lengthwise edges of the blank so that sheet metal edges are covered.

Referring now to the drawing and to Figures 1 and 2, a stem for supporting and turning the steering fork is indicated at 10. An upper end 12 of the stem may be threaded or otherwise formed for linking to other parts of a bicycle.

The lower end of the stem 10 is attached to a sheet metal fork 13. The fork 13 may be formed from a blank 14 of the shape shown in Figure 6.

The blank 14 includes a central straight section 16 and outwardly extending outer portions 17 at either end of the central section 16. The outer portions 17 may meet the central section 16 at oblique angles, both outer portions extending in the same direction and at equal angles from the central section 16. The central section 16 and portions 17 may taper gradually from the center. At the ends of the portion 17 are located tips 18 which may be narrower than the section 16 and portions 17.

The blank 14 is shaped as shown in Figures 1 and 2 and in the sectional details Figures 3, 4, and 5. Opposite lengthwise edges 19 of the blank 14 are rolled upon themselves to form beads 20. The tips 18 are not given a bead. As shown in Figures 3 and 4, opposite beads 20 are spaced apart a greater distance at the center of the fork 13 and are spaced apart a lesser distance at the ends. The edges 19 of the blank are rolled until they abut a central flat portion 21 of the fork.

The blank is bent lengthwise to a U-shape as shown in Figure 1. As shown in Figures 1 and 3, the fork 13 is equipped with a central bore 22 for receiving the lower end of the stem 10. The bore 22 may be between opposite beads. The stem 10 may be welded or otherwise firmly attached in the bore 22. A screw 23 adjacent the bore 22 can be used for supporting a mud guard or the like. A bearing ring 24 may be mounted about the stem 10 to bear on the fork 13. From the U-shaped central portion, the fork extends in a pair of parallel arms 25.

Ends 26 of the fork 13 at the extremities of the arms 25 are formed from the tips 18 of the blank. The edges of the ends 26 are turned about themselves and swaged flat, as indicated in Figure 5 with opposite edges 27 of the ends in contact. As shown in Figure 2, the ends 26 may be slotted, as at 28, to receive an axle of a bicycle. In the form shown in Figure 7, an end 126 of a fork 113 may be bored, as shown at 29 in Figure 7, for receiving the axle.

As shown in Figure 2, each arm of the fork 13 includes a straight upper section 30, a lower section 31 joined to the upper section at an obtuse angle, and an end 26. These parts correspond respectively to the straight central section 16, the outer portions 17, and the tips 18 of the blank.

The provision of lengthwise beading along the edges permits the arms 25 of the steering fork to flex toward one another to a slight degree but renders them resistant to distortion in other directions. The space between beads at the center of the fork makes a convenient seat for receiving the bore 22 and for attaching the stem 10 to the fork 13. As shown in the drawings, the fork may be relatively flat in the portion 21 between beads, and the bore 22 passes through a single thickness of relatively flat material.

As shown in Figure 3, the opposite beads may be spaced a greater distance at the center of the fork than elsewhere. A lower end 32 of the stem 10 may fit through the bore 22 and, as shown in Figure 1, may further extend between the beads 20. The beads additionally may be rounded, as shown in Figure 3, about the end 32 to provide a substantial surface for receiving a weld between the stem 10 and the fork 13.

The general shape of the arms 25 may be varied by appropriate change in the shape of the blank 14. Various other modifications in the construction will be apparent, and the invention is not intended to be limited by the foregoing detailed description and the drawing except as set out in the appended claims.

What is claimed is:

1. A steering assembly comprising a one-piece inverted U-shaped sheet metal fork, lengthwise edges of said fork being rolled inwardly to form lengthwise strengthening beads along the inner sides of said fork, said beads being spaced at the crown of the fork, said fork having an opening at the center thereof between opposite beads, and a cylindrical stem mounted in said opening and extending upwardly from said fork, a lower end of said stem extending between the beads, the beads being deformed arcuately at the crown to form arcuate bearing surfaces and embracing opposite sides of the lower tip of the stem to hold the stem and the fork in assembled relation.

2. A bicycle fork having spaced arms and a crown of a unitary blank of sheet metal, the opposite edges of the blank being curved inwardly against the inner face of the blank to form lengthwise beads, the metal between the beads at the crown of the fork having a steering post receiving aperture and the beads on opposite sides of the aperture being displaced laterally to form arcuate bearing surfaces for the lower end of a post, and a post having its lower end extending through said aperture and in engagement with said beads, the lower end of said post being embraced by said beads.

EWALD F. PAWSAT.
RUBEN L. PAWSAT.

REFERENCES CITED

The following references are of record in the file of this patent:

UNITED STATES PATENTS

| Number | Name | Date |
|---|---|---|
| 312,732 | Knous et al. | Feb. 24, 1885 |
| 1,133,814 | Miller | Mar. 20, 1915 |
| 1,703,866 | Bowman | Mar. 5, 1929 |
| 1,883,033 | Snell | Oct. 18, 1932 |
| 2,128,953 | Miller | Sept. 6, 1938 |

FOREIGN PATENTS

| Number | Country | Date |
|---|---|---|
| 972 | Great Britain | 1887 |